(12) United States Patent
Edwards et al.

(10) Patent No.: US 6,459,442 B1
(45) Date of Patent: Oct. 1, 2002

(54) SYSTEM FOR APPLYING APPLICATION BEHAVIORS TO FREEFORM DATA

(75) Inventors: W. Keith Edwards, San Francisco, CA (US); Elizabeth D. Mynatt, Atlanta, GA (US); Anthony G. LaMarca, Redwood City, CA (US); Takeo Igarashi, Chigasaki (JP)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/452,530

(22) Filed: Dec. 1, 1999

Related U.S. Application Data

(60) Provisional application No. 60/153,363, filed on Sep. 10, 1999.

(51) Int. Cl.[7] .................................................. G06F 3/00
(52) U.S. Cl. ........................ 345/863; 345/765; 345/866; 345/700
(58) Field of Search ................................ 345/863, 442, 345/866, 619, 765, 700

(56) References Cited

U.S. PATENT DOCUMENTS

| | | | | |
|---|---|---|---|---|
| 5,404,439 A | * | 4/1995 | Moran et al. ............... | 345/814 |
| 5,553,224 A | * | 9/1996 | Saund et al. ............... | 345/619 |
| 5,583,946 A | * | 12/1996 | Gourdol ..................... | 382/187 |
| 5,861,886 A | * | 1/1999 | Moran et al. ............... | 345/863 |
| 5,880,743 A | | 3/1999 | Moran et al. ............... | 345/473 |
| 6,377,288 B1 | * | 4/2002 | Moran et al. ............... | 345/863 |

OTHER PUBLICATIONS

Abowd, Gregory D. et al. "Teaching and Learning as Multimedia Authoring: The Classroom 2000 Project," Proceedings of ACM Multimedia '96, Boston, Massachusetts, pp. 187–198.

Bederson, Benjamin B. et al. "Pad++: A Zooming Graphical Interface for Exploring Alternate Interface Physics," Proceedings of UIST '94, Marina Del Rey, California, Nov. 2–4, 1994, pp. 17–26.

Bier, Eric A. et al. "Toolglass and Magic Lenses: The See–Through Interface," Computer Graphics Proceedings of SIGGRAPH 93, Anaheim, California, Aug. 1–6, 1993, pp. 73–80.

Dourish, Paul et al. "Using Properties for Uniform Interaction in the Presto Document System," submitted to UIST '99, 12th Annual ACM Symposium on User Interface Software and Technology to be held Nov. 7–10, 1999 in Asheville, NC.

Edwards, W. Keith "Flexible Conflict Detection and Management in Collaborative Applications," Proceedings of UIST '97 Banff, Alberta, pp. 139–148.

Edwards, W. Keith et al. "Timewarp: Techniques for Autonomous Collaboration," Proceedings of ACM Conference on Human Factors in Computing Systems (CHI '97), Atlanta, GA., Mar. 22–27, 1997.

Forsberg, Andrew et al. "The Music Notepad," Proceedings UIST '98, San Francisco, California, pp. 203–210.

(List continued on next page.)

*Primary Examiner*—John Cabeca
*Assistant Examiner*—Brian Detwiler

(57) ABSTRACT

A freeform display editing system groups freeform strokes into one or more segments on a display. Each segment in the system defines a region of the display that includes a collection of strokes. Multiple behaviors can be dynamically attached or removed from any given segment, even after a segment has been created and filled with strokes. Each behavior provides a task-specific application to the segment to which it is attached. Segments de-couple interpretations of input data from behaviors to provide temporal multiplexing of task-specific applications. Advantageously, data associated with a segment can be composed at the same time by different behaviors.

20 Claims, 16 Drawing Sheets

OTHER PUBLICATIONS

Gamma, Erich et al. Design Patterns Elements of Reusable Object–Oriented Software, Addison–Wesley Publishing Company, Inc., 1995, pp. 233–242.

Geissler, Jorg "Shuffle, Throw or Take It! Working Efficiently with an Interactive Wall,"Proceedings of CHI '98, Apr. 18–23, 1998, New York, ACM, pp. 265–266.

Gross, Mark D. et al. "Ambiguous Intentions: A Paper–like Interface for Creative Design," Proceedings, Ninth Annual Symposium for User Interface Software and Technology, (UIST '96), p. 183–192.

Igarashi, Takeo et al. "Demonstrating Flatland User Interfaces," ACM SIGCHI Proceedings from Conference on Human Factors in Computing Systems, Extended Abstract, Pittsburgh, May 15–20, 1999, pp. 27–28.

Igarashi, Takeo et al. "Flatland: An Electric Whiteboard System," demonstration movie published on the internet at http://www.mtl.t.u–tokyo.ac.jp/~takeo/research/flatland/flatland.html on May 27, 1999. (see "flatland.avi" on the ZIP—DOS disk submitted with this IDS).

Igarashi, Takeo et al. "Pegasus: A Drawing System for Rapid Geometric Design," CHI'98 summary, Los Angels, U.S.A, Apr. 18–23, 1998, pp. 24–25.

Igarashi, Takeo et al. "Teddy: A Sketching Interface for 3D Freeform Design," ACM SIGGRAPH 99, Los Angeles, CA, Aug. 8–13, 1999.

Ishii, Hiroshi et al. "Tangible Bits: Towards Seamless Interfaces between People, Bits and Atoms," Proceedings of CHI '97, Mar. 22–27, 1997, Atlanta, Georgia, pp. 234–241.

Kramer, Axel "Translucent Patches—Dissolving Windows," Proceedings of Seventh Annual Symposium on User Interface Software and Technology, (UIST '94), pp. 121–130.

Landay, James A. et al. "Interactive Sketching for the Early Stages of User Interface Design," Proceedings of CHI '95.

Moran, Thomas P. et al. "Evolutionary Engagement in an Ongoing Collaborative Work Process: A Case Study," Proceedings of Computer Supported Cooperative Work '96, Cambridge, Massachusetts, pp. 150–159.

Moran, Thomas P. et al. "Implicit Structures for Pen–Based Systems with a Freeform Interaction Paradigm," Proceedings of CHI '95, May 7–11, 1995, Denver, Colorado, pp. 487–494.

Moran, Thomas P. et al. "Spatial Interpretation of Domain Objects Integrated into a Freeform Electronic Whiteboard," Proceedings UIST '98, San Francisco, California, pp. 175–184.

Moran, Thomas P. et al. "Tailorable Domain Objects as Meeting Tools for an Electronic Whiteboard," Proceedings of CSCW '98, Seattle, Washington, pp. 295–304.

Mynatt, Elizabeth D. et al. "Flatland: New Dimensions in Office Whiteboards," Proceedings of CHI '99, Pittsburgh, Pennsylvania, May 15–20, 1999, pp. 346–353.

Nakagawa, Masaki et al. "Human Interface and Application on IdeaBoard," INTERACT '97, pp. 501–508.

Pedersen, Elin Ronby et al. "Tivoli: An Electronic Whiteboard for Informal Workgroup Meetings," Proceedings of INTERCHI '93, Amsterdam, Apr. 24–29, 1993, pp. 391–398.

Perlin, Ken "Quikwriting: Continuous Stylus–Based Text Entry," Proceedings UIST '98, San Francisco, California, pp. 215–216.

Rekimoto, Jun "A Multiple Device Approach for Supporting Whiteboard–Based Interactions," Proceedings of CHI '98, Los Angeles, California, Apr. 18–23, 1998, pp. 344–351.

Rekimoto, Jun "Pick–and–Drop: A Direct Manipulation Technique for Multiple Computer Environments," Proceedings of UIST '97.

Saund, Eric et al. "A Perceptually–Supported Sketch Editor," Proceedings of UIST '94, Marina Del Rey, California, Nov. 2–4, 1994, pp. 175–184.

U.S. Patent Application Serial No. 08/736,883 entitled "Apparatus and Method for Supporting the Implicit Structure of Freeform Lists, Outlines, Text, Tables, and Diagrams in a Gesture Based Input System and Editing System," to Thomas P. Moran et al., filed Oct. 25, 1996.

Weiser, Mark "The Computer for the 21$^{st}$ Century," Scientific American vol. 265, No. 3, 1991, pp. 94–104.

Zeleznik, Robert C. et al "SKETCH: An Interface for Sketching 3D Scenes," Proceedings of SIGGRAPH '96, New Orleans, Louisiana, Aug. 4–9, 1996, pp. 163–169.

* cited by examiner

FIG. 5
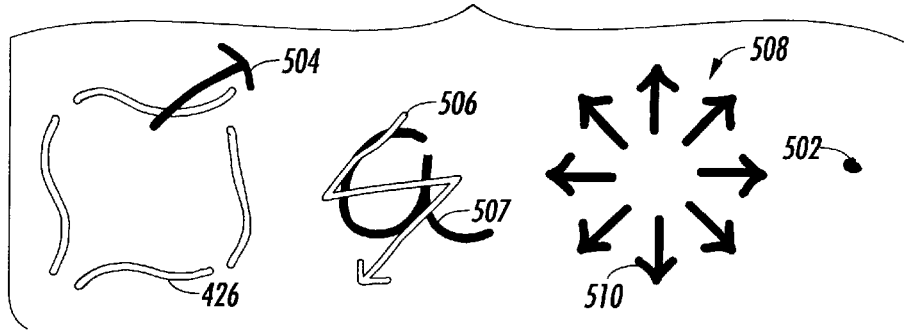
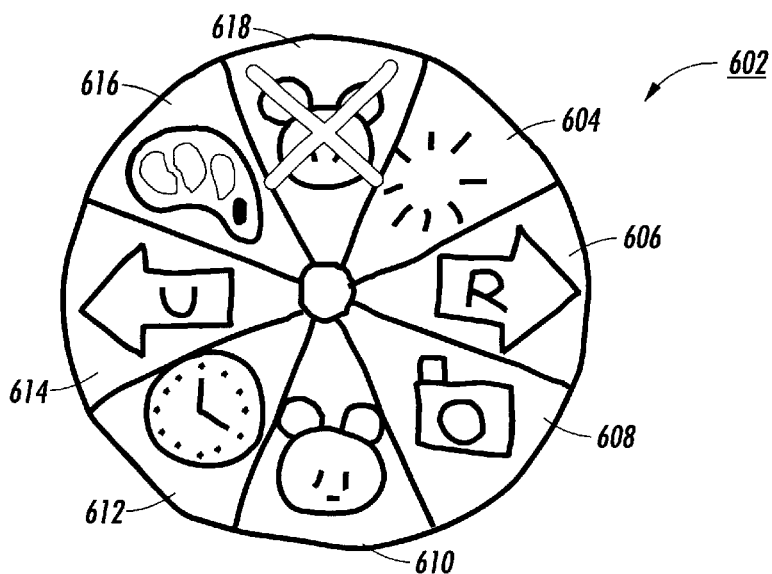
FIG. 6
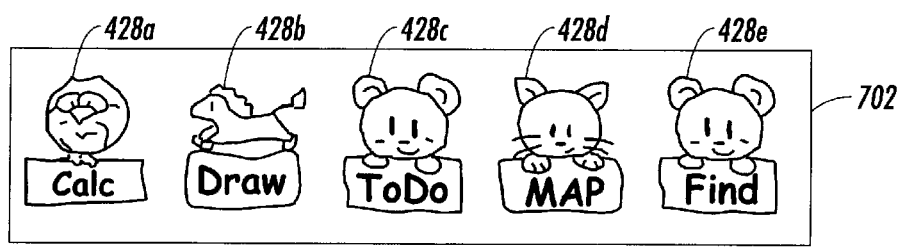
FIG. 7

FIG. 12
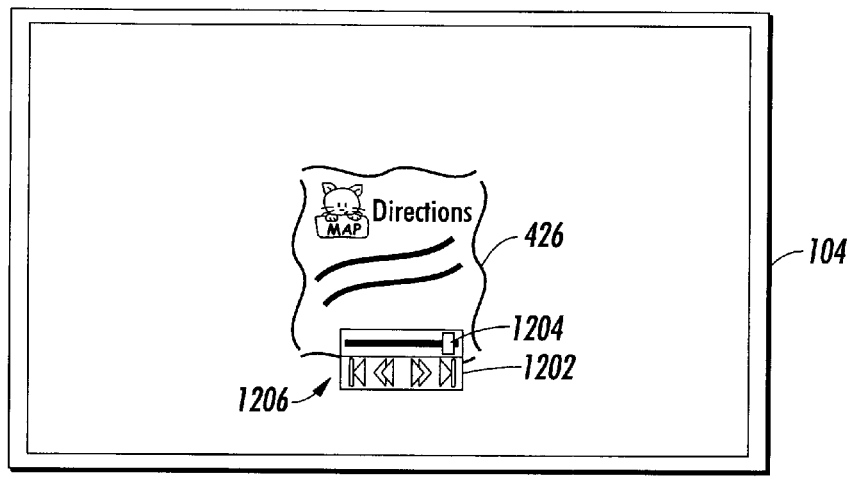
FIG. 13
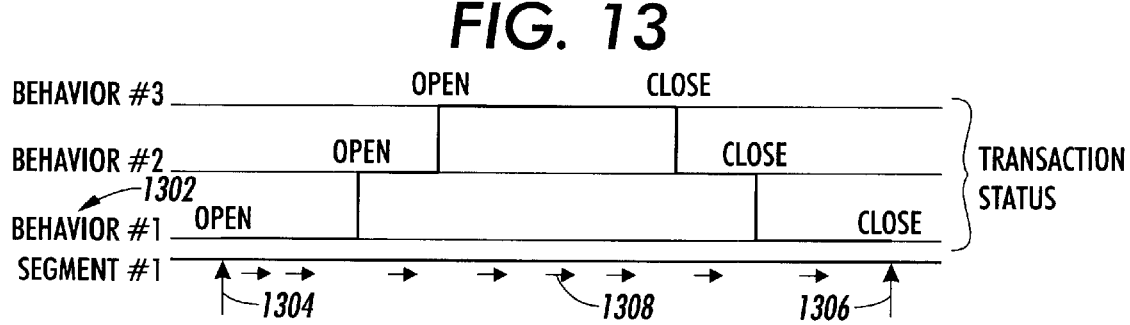
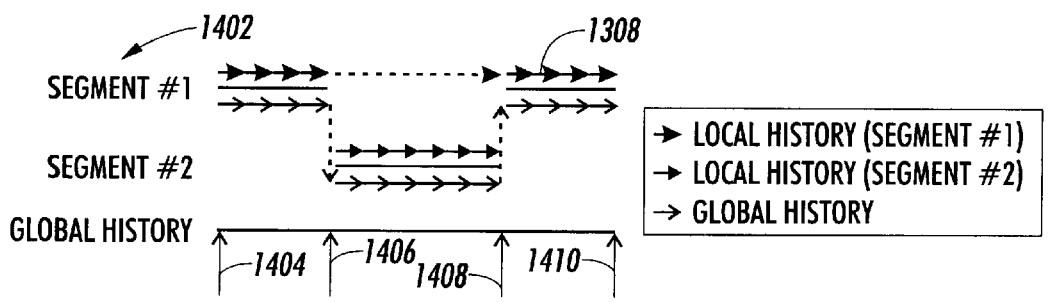
FIG. 14

FIG. 15
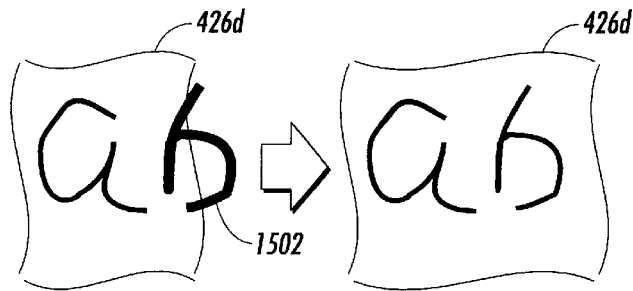
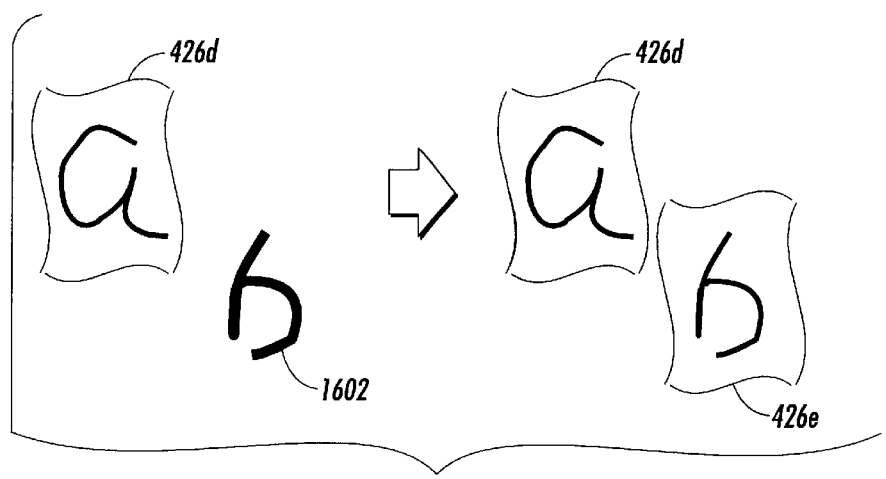
FIG. 16
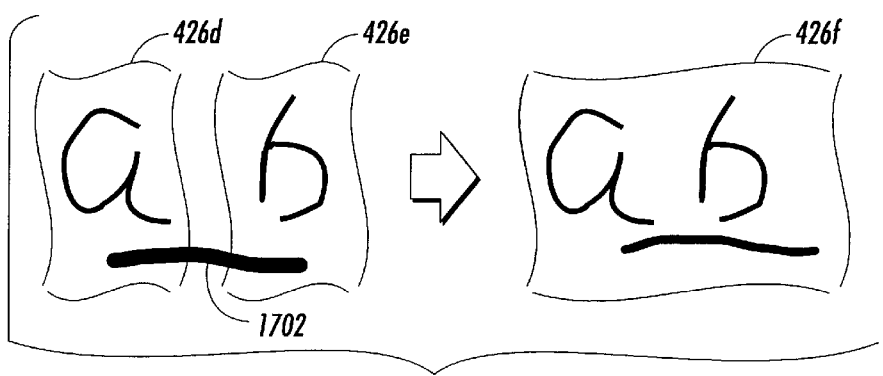
FIG. 17

FIG. 18
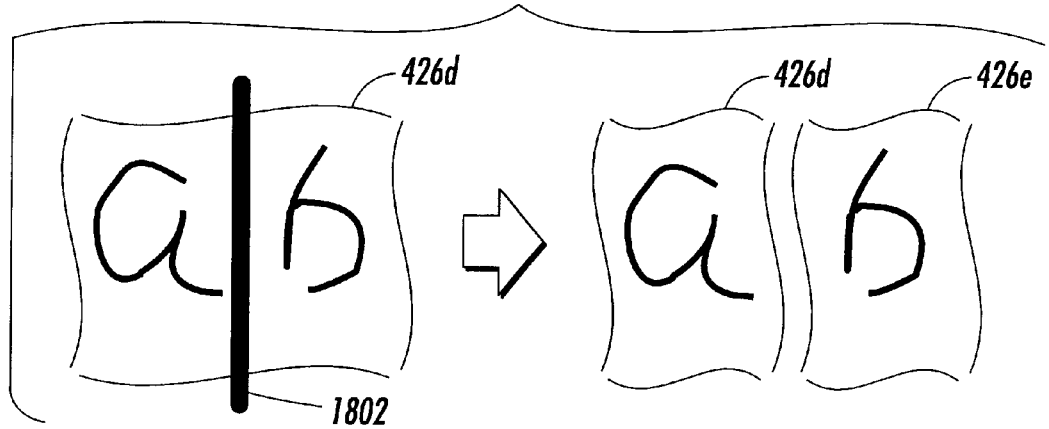
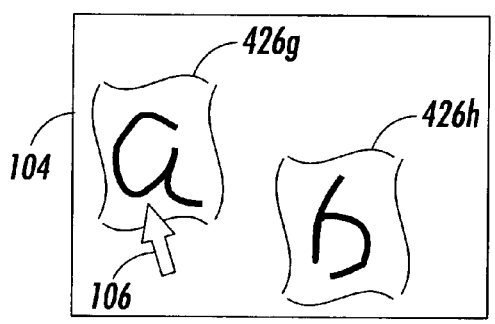
FIG. 19
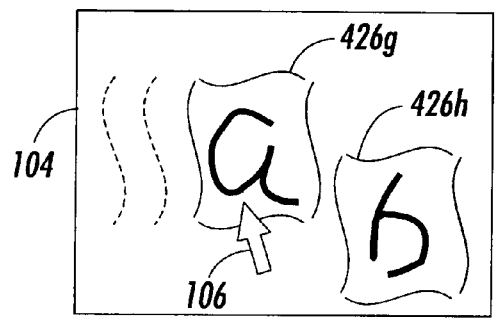
FIG. 20

SYSTEM FOR APPLYING APPLICATION BEHAVIORS TO FREEFORM DATA

Priority is claimed from U.S. Provisional Application No. 60/153,363, filed Sep. 10, 1999.

BACKGROUND OF THE INVENTION

1. Field of the Invention

The present invention relates generally to computer-controlled graphical drawing and editing systems, and more particularly, to a method and apparatus for applying behaviors to freeform data.

2. Description of Related Art

Window based computer controlled graphical drawing and editing systems that are used to control displays of, for example, desktop computers, Portable Digital Assistants (PDA), and electronic whiteboards, are well known. These displays are adapted to accept input data that includes but is not limited to pen-based freeform strokes, key strokes, and mouse clicks. An attribute of such window based systems is that they tend to closely couple input data to a specific application program. This effectively yields "data specific" application programs that are tightly coupled to a particular form of data.

In addition to being data specific, an application program running in a window based operating environment is tightly bound to the particular window in which the application program is running. That is, an application program executing in window based system tends to maintain complete control over its on-screen real estate. This yields an operating environment in which an application program has exclusive control over the particular window in which data is input, thereby impeding simultaneous interpretation and exchange of data between application programs.

More specifically, in such window based operating environments it is difficult to create a set of data that is "outside" of a particular data specific application program. For example in a windows based system, a set of data representing a spreadsheet would generally not be written to disk without first being processed by a spreadsheet application program. This means that application programs operating in windows based systems are responsible for both "creating" content (i.e., data) as well as "interpreting" content. A consequence of being a "data specific" application program is that content is not freely exchanged with other application programs.

Systems that are controlled with freeform strokes are not well suited for operating application programs that produce data specific content. One reason for this is because graphical user interfaces (GUI) operating in window environments execute application programs that expect to operate on data in a particular way. For example, a drawing program provides tools for drawing, while a word processor program provides tools for writing. The data created by each of these programs (i.e., drawing and writing) is application dependent (i.e., behavior dependent). This creates a operating environment that does not readily permit data entered at a GUI to have multiple simultaneous interpretations (i.e., behaviors).

It is therefore desirable to provide an architecture for a system that decouples data creation and data interpretation. Such a system architecture would advantageously provide that data input at a GUI have multiple simultaneous interpretations by a plurality of application programs. In addition, this system architecture would advantageously provide "data independent" application programs that allow the creation of data independent from particular "behaviors" that can be applied to the data by each of a plurality of application programs.

SUMMARY OF THE INVENTION

In accordance with the invention, there is provided a freeform display editing system in which behaviors can be selectively applied to freeform data. The elements of the system include strokes, segments, and behaviors. A stroke is a universal data type that in one embodiment is defined as an array of vertices that represent visual ink on a display of the system. A segment represents as an entity that maintains a collection (i.e., set) of strokes within a specific region of the display. A behavior is a task-specific application that is uniquely associated with a segment. In operation, a behavior interprets the collection of strokes maintained by a segment according to the behavior's task-specific application.

In accordance with one aspect of the invention, data is automatically grouped into segments to define a collection of data (e.g., recorded freeform input in the form of strokes), independent from any task-specific application. This effectively defines an independent relationship between data (i.e., strokes) and behaviors that are applied to the data. In operation, behaviors are freely attached and detached from a given segment over time to provide temporal multiplexing of different task-specific applications to freeform input. When a behavior is attached to a segment, it interprets the collection of strokes maintained by the segment independent of any other behavior. Advantageously, segments provide a way to manage content independent of behaviors that provide task-specific applications.

In accordance with another aspect of the invention, there is provided a method and apparatus therefor for operating a computer system. The computer system includes a display and a user input device for generating freeform input strokes. In operation, a segment controller receives a freeform input stroke generated with the user input device. The segment controller distributes the freeform input stroke to a selected segment that maintains a set of freeform output strokes in a memory and that identifies a unique region of the display. The selected segment dispatches the freeform input stroke to a plurality of behaviors. The plurality of behaviors, which are uniquely associated with the selected segment, include at least one user specified application behavior that defines a task specific function. The freeform input stroke is processed at the plurality of behaviors that are uniquely associated with the selected segment. Each of the plurality of behaviors independently modifies the set of freeform output strokes recorded in the memory. After processing the freeform input stoke at the plurality of behaviors, the set of freeform output strokes recorded in the memory are rendered in the unique region of the display.

BRIEF DESCRIPTION OF THE DRAWINGS

These and other aspects of the invention will become apparent from the following description read in conjunction with the accompanying drawings wherein the same reference numerals have been applied to like parts and in which:

FIG. 5 illustrates a set of gestures that are used for managing the visual layout of the display shown in FIG. 1;

FIG. 6 illustrates a pie menu that is accessed on a display using a tap gesture;

FIG. 7 illustrates an example of a behavior menu for invoking particular behaviors;

FIG. 12 illustrates an example of a time slider for accessing stored strokes, segments, and behavior history;

FIG. 13 illustrates a transaction being open and closed as a behavior is executed by a segment;

FIG. 14 illustrates the manner in which semantic jumps are performed by the segment controller;

FIG. 15 illustrates the automatic joining of a stroke to an existing segment;

FIG. 16 illustrates assigning a stroke to a new segment;

FIG. 17 illustrates the manual joining of two segments;

FIG. 18 illustrates the manual splitting of two segments;

FIG. 19 illustrates the selection and dragging of one segment (with an "a") towards another segment (with a "b");

FIG. 20 the pushing away of the segment (with a "b") as a result of the action initiated in FIG. 19 with respect to the segment (with an "a");

DETAILED DESCRIPTION

A. Operating Environment

Figure 1:
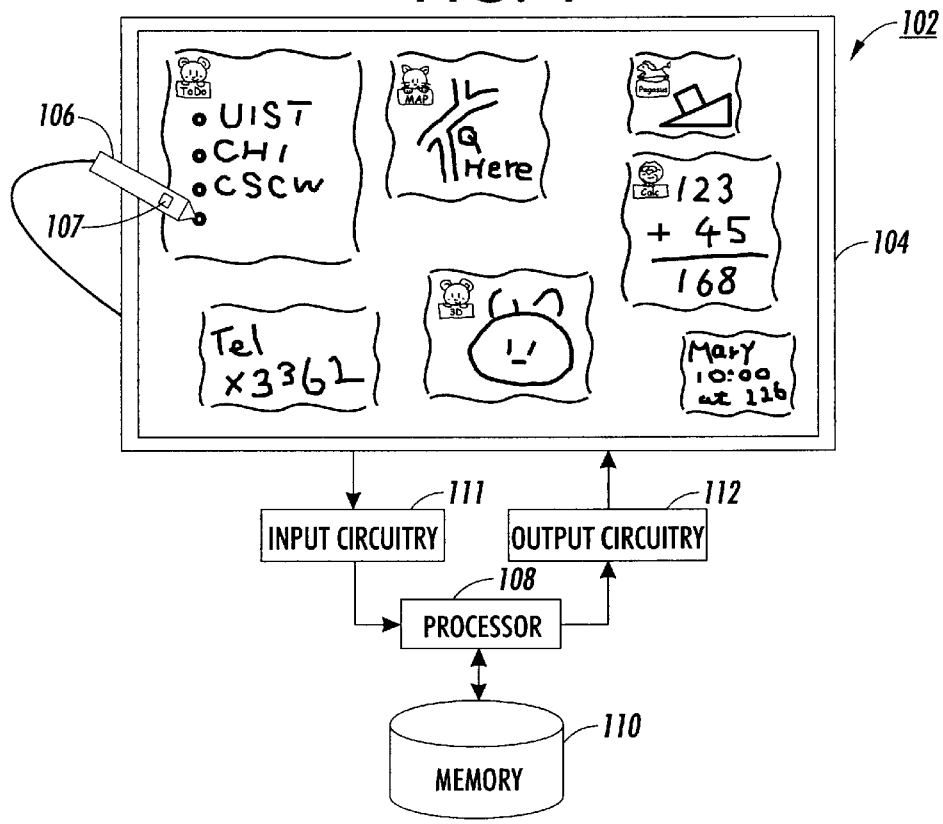
FIG. 1 illustrates a freeform display editing system for performing the present invention.

FIG. 1 illustrates a freeform display editing system 102 for performing the present invention. The freeform display editing system 102 includes a display 104, a user input device 106, a processor 108, and memory 110. The processor 108 receives input data generated at the display 104 with the input device 106 through input circuitry 111 and produces output data to be rendered on display 104 through output circuitry 112. In one embodiment, the display 104 is a touch sensitive LCD (liquid crystal display) that can be invoked using a pointing device such user input device 106. In an alternate embodiment, the display is adapted to operate using a plurality of pointing devices the output of which is uniquely identifiable on the display by color or form (e.g., dashed lines). The memory 110 includes program instructions and program data for controlling the freeform display editing system 102. Responsive to input received through circuitry 111, the processor 108 controls the operation of the freeform display editing system 102, the details of which are described below.

Figure 2:
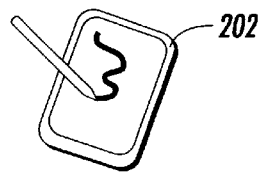
FIG. 2 illustrates the freeform display editing system shown in FIG. 1 operating as a PDA (portable digital assistant)
Figure 3:
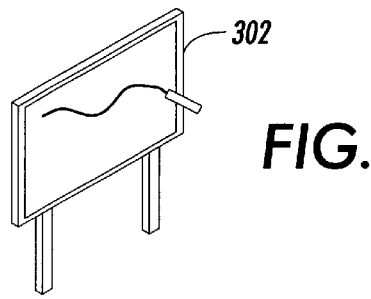
FIG. 3 illustrates the freeform display editing system shown in FIG. 1 operating as a whiteboard.

FIGS. 2 and 3 illustrate two different embodiments in which the freeform display editing system 102 can operate. FIG. 2 illustrates the freeform display editing system operating as a PDA (portable digital assistant) 202. Alternatively, FIG. 3 illustrates the freeform display editing system 102 operating as a whiteboard 302. It will be appreciated, however, by those skilled in the art that the architecture for supporting freeform interactions operating on the freeform display editing system 102 is not limited to either the PDA 202 or the whiteboard 302, shown in FIGS. 2 and 3 respectively. Instead, the architecture described below could be used at any computer interface to more generally maintain various forms of input (e.g., key strokes and mouse clicks) in a unified manner independent of application programs that are adapted to apply particular behaviors to the input.

B. System Architecture Overview

Figure 4:
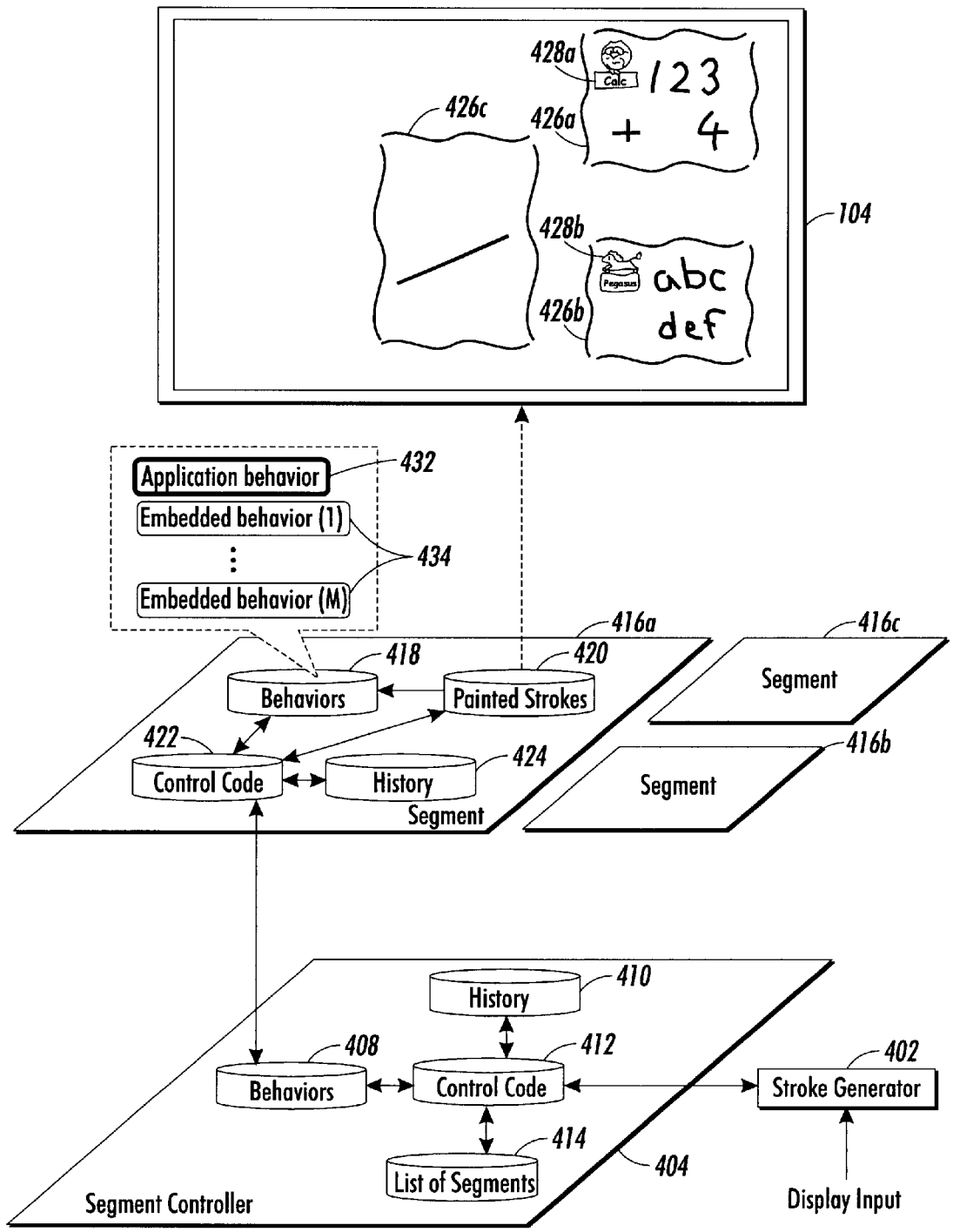
FIG. 4 illustrates a system architecture for supporting freeform interaction on the display of the freeform display editing system shown in FIG. 1.

FIG. 4 illustrates a system architecture for supporting freeform interaction on the display 104 of the freeform display editing system 102 shown in FIG. 1. This architecture provides that strokes are the most basic primitive of the system. In a preferred embodiment, user input comprises freehand strokes with no pull-down menus, buttons, handles, and the like. Consequently, all information processing is seen as the manipulation of a set of strokes on the display 104. Strokes are generated by a user at anytime and in any freeform manner using the input device 106 on the display 104. A stroke generator 402 receives strokes and parses the input to define events to distribute to the segment controller 404.

The segment controller 404, which controls events received from the stroke generator 402 that influence the entire display 104, comprises a set of behaviors 408, history 410, control code 412, and a list of segments 414, all of which are recorded in memory 110. Associated with each segment 416 that is identified in the list of segments 414 is a set of behaviors 418, a list of painted strokes 420 (i.e., output strokes), control code 422, and history 424, which are also recorded in memory 110. In operation, each segment 414 allows a user to manipulate multiple strokes within a region of the display 104. Segments unlike a windows based system are flexibly joined or split.

The control code 422 of each segment 416 identified in the list of segments 414 delegates actual computation to the behaviors 418 associated therewith. In general, each behavior responds to various events that occur on the segment that each is associated with, to either modify the segment's stroke set (i.e., painted strokes 420) or perform behavioral specific operations (e.g., map drawing).

At any point in time, a set of behaviors 418 in a segment 416 can have one application behavior 432 (highlighted in the Figures with a dark border) and a plurality of embedded behaviors 434 (highlighted in the figures with a light border). Each application behavior 432 is uniquely associated with a segment 416 to provide a task-specific function. In operation, an application behavior interprets input strokes and painted strokes grouped with a segment. Once interpreted, the behavior can either add to or replace existing strokes grouped with the segment. A segment 416, however, is not required to have an application behavior 432 assigned to it by a user. When no application behavior is assigned, a default high level behavior called a "plain drawing" behavior is automatically associated with a segment by the system.

An application behavior 432 that has been applied to a segment 416 is visible to a user at the display 104 in a corresponding display segment 426 with a behavior identifier 428. In one embodiment, the behavior identifier 428 is an icon that is located in the upper right corner of a display segment 426. The icon is used to depict a metaphor of an assistant that interprets user input and personifies the task-specific application of the behavior. In FIG. 4, three display segments 426 are illustrated, two of which (i.e., 426b and 426c) have behavior identifiers 428.

Embedded behaviors 434, which are not visible to on a display segment 426, provide basic services to a segment 416. Unlike the limit of one application behavior per segment, multiple embedded behaviors can coexist together on the same segment at the same time. In one embodiment, application behaviors are applied one at a time on a given segment. However, any number of application behaviors may be applied to a segment over time. The restriction of applying one application behavior at a time to a segment is done to prevent semantic conflicts between behaviors (e.g., two application behaviors may use the same gestures to mean two different commands).

It will be appreciated, however, by those skilled in the art that in alternate embodiments this restriction may be relaxed by having behaviors that adhere to well defined interoperability standards. Application behaviors 432 are typically applied and removed to a segment 104 by a user. In an alternate embodiment, application behaviors are automatically added in response to an inferencing engine that attempts to determine how a user is using a segment.

C. Invoking Behaviors

The freeform display editing system 102 has two modes of stylus input. The primary mode is for drawing freeform strokes on the display 104. The secondary mode is activated to create meta-strokes. In one embodiment, metastrokes are created by holding a button 107 on the input device 106 shown in FIG. 1. These meta-strokes form gestures that are used for managing the visual layout of the display 104. In addition, these meta-strokes are used to apply behaviors to segments. A set of gestures, which is illustrated in FIG. 5, include a tap gesture 502, a move gesture 504, an erase gesture 506, and shortcut gestures 508. The gestures are shown in FIG. 5 using arrows to specify a direction in which to draw a meta-stroke to invoke a particular gesture if the gesture is more than a point.

The tap gesture 502 is formed by drawing a dot on the display 104 using the input device 106 with the button 107 depressed. Responsive to the drawing of a tap gesture, a pie menu 602, as illustrated for example in FIG. 6, appears on display 104. Each section of the pie menu 602 is associated with the following commands: delete 604, redo 606, take snapshot 608, apply behavior 610, time slider 612, undo 614, color 616, and undo behavior 618. The shortcut gestures 508 provide immediate access to each command in the pie menu 602. For example, the shortcut gesture 508 for invoking the apply behavior command 610 is the shortcut arrow 510 (shown in FIG. 5).

Behaviors 432 have the property of being associated with or de-associated with a segment 416 in real time (i.e., on the fly). In the embodiment shown in the Figures, an application behavior 432 is applied to a segment by performing a meta-stroke of the tap gesture 502 to bring up the pie menu 602 on the display. After invoking the apply behavior command 610 in the pie menu 602, a behavior menu is displayed on display 104. FIG. 7 illustrates an example of a behavior menu 702 for invoking particular behaviors. A behavior is invoked in the behavior menu by selecting one of a plurality of unique identifiers 428a, 428b, 428c, 428d, and 428e. Each of these unique identifiers correspond a calculator behavior, a draw behavior, a to do behavior, a map behavior, and a find behavior, respectively, which are described in more detail below in Section H.

D. Context-Based Processing Of Strokes

Figure 8:
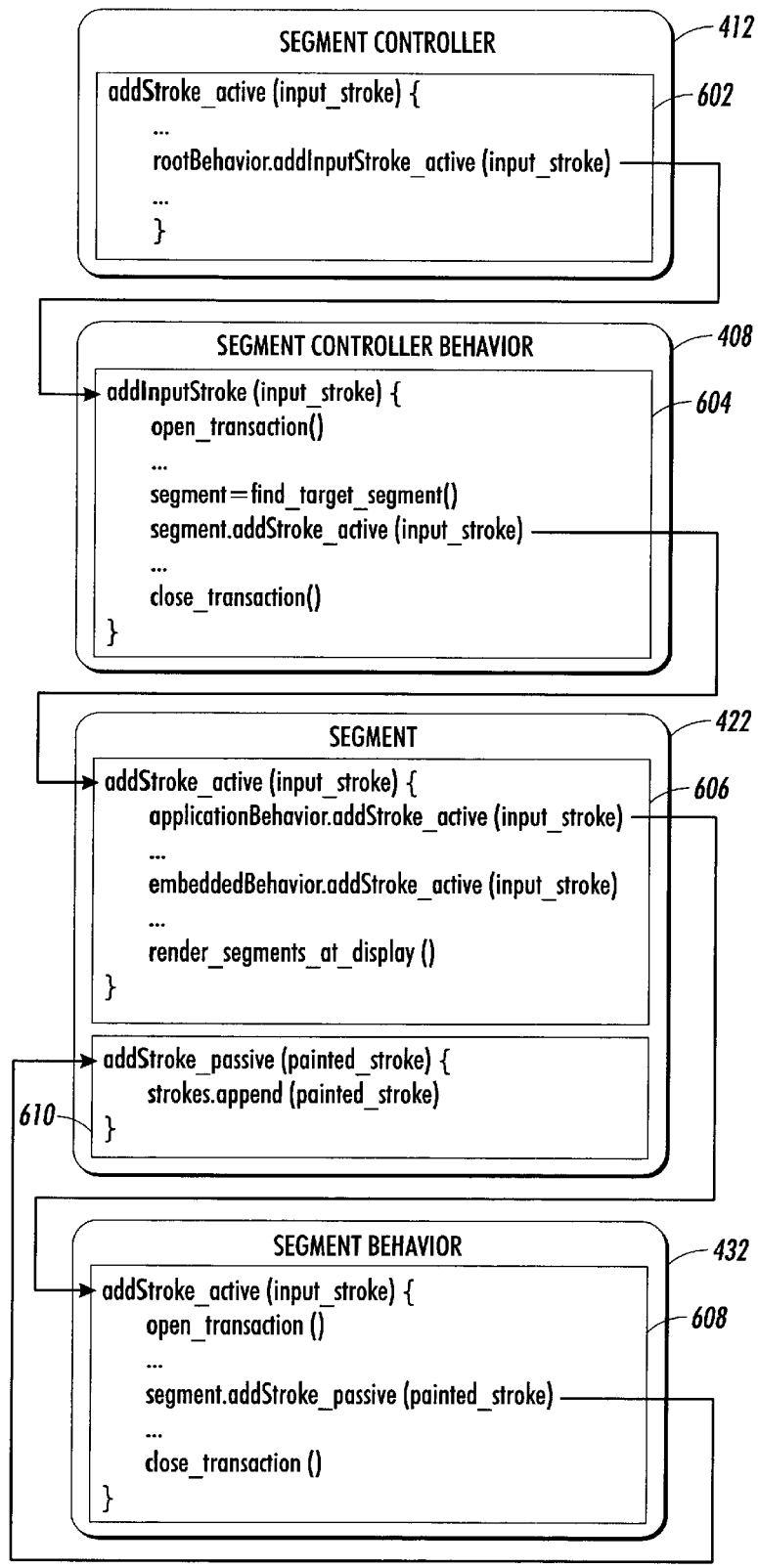
FIG. 8 illustrates a generalized example of event processing performed by segments.

The freeform display editing system defines strokes as the universal primitive for both data input and output. In one embodiment, the user's input at the display is provided in the form of freeform strokes (i.e., input strokes), and the feedback provided to the user is in the form of a collection of handwriting style strokes (i.e., painted or output strokes). Since both input and output is in the form of strokes, the system is capable of using its own output as later input to behaviors. In this embodiment, when a user draws a stroke on the display 104, one of a plurality of events may occur. FIG. 8 illustrates a generalized example of event processing performed by the segment controller 404 and one segment 416. In order for multiple behaviors to simultaneously coexist on a segment, painted strokes (i.e., output strokes) are not rendered on the display 104 until all of the behaviors associated with a particular segment have each had the opportunity to independently interpret an input stroke and existing painted strokes.

After a user has completed an input stroke on the display 104, this "event" is delivered by the "add stroke active" method 602 in the segment controller 404 to one of the behaviors 408. Generally, events are distributed by the segment controller behaviors associated with it by the type of event. In the example shown in FIG. 8, the "input stroke" event is processed by the "add input stroke" segment controller behavior 604. Initially, this method attempts to locate a segment in which to associate the input stroke. If the input stroke was draw on the display within a predefined distance of a segment's bounded region (i.e., visual density), then the input stroke is associated with that segment. If the input stroke is located outside the predefined distance of any segment's bounded region, then the method associates the input stroke with a newly created segment. In either case, the input stroke is not added to the selected segment's associated set of painted strokes 420 (i.e., output strokes).

In an alternate embodiment, contextual clues in which an input stroke is made are used to identify the segment (existing or non-existing) in which to associate the input stroke. The contextual clues that can be used to automatically segment input strokes into bounded regions include: the time at which the stroke was input, the presence of and/or input from other people near the display, and input from other colored pointing devices operating at the display. In yet another embodiment, input strokes are grouped using any combination of the following: contextual clues, visual density, and other observable patterns such as orientation or recognition of known similar content. In yet a further embodiment, at least one of the segments existing on the display at any one time is identified as an "active segment." When a segment has the property of being an active segment, this property is used to bias or break ties in which other grouping techniques yield uncertain results.

Once segment control code 422 of a segment receives an input stroke, it is first passed to an application behavior at method 606. As set forth above, a user need not associate a particular application behavior with a segment. If an application behavior is not explicitly associated with a segment, then a default application behavior is attached to the segment. In processing an input stroke, a method 608 of an application behavior applies its own unique semantics to the input stroke as well as painted strokes that are associated with a segment. To preserve the integrity of painted strokes on the display, any changes (i.e., additions or deletions) of painted strokes are processed by the control code 422 of a segment at method 610. After the application behavior of a segment is called, the control code 422 of a segment may call one or more embedded behaviors 434. After application and embedded behaviors are called by a particular segment, the segment is rendered on display 104. That is, behaviors do not render painted segments themselves, they only modify the set of painted strokes belonging to a segment.

E. Illustrative Example Of Behavior Operation

Figure 9:
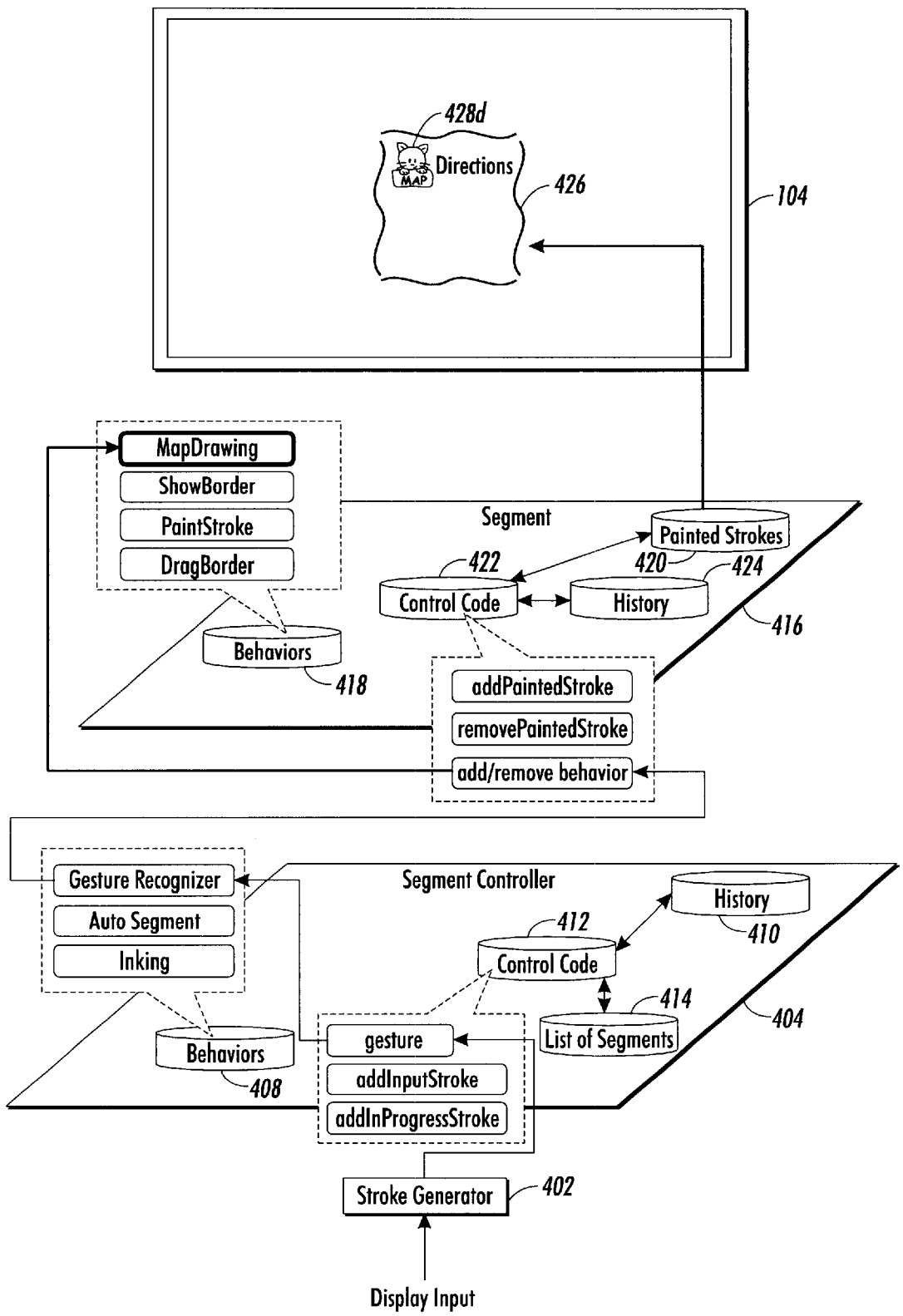
FIG. 9 illustrates the manner in which a behavior is added to a segment.
Figure 10:
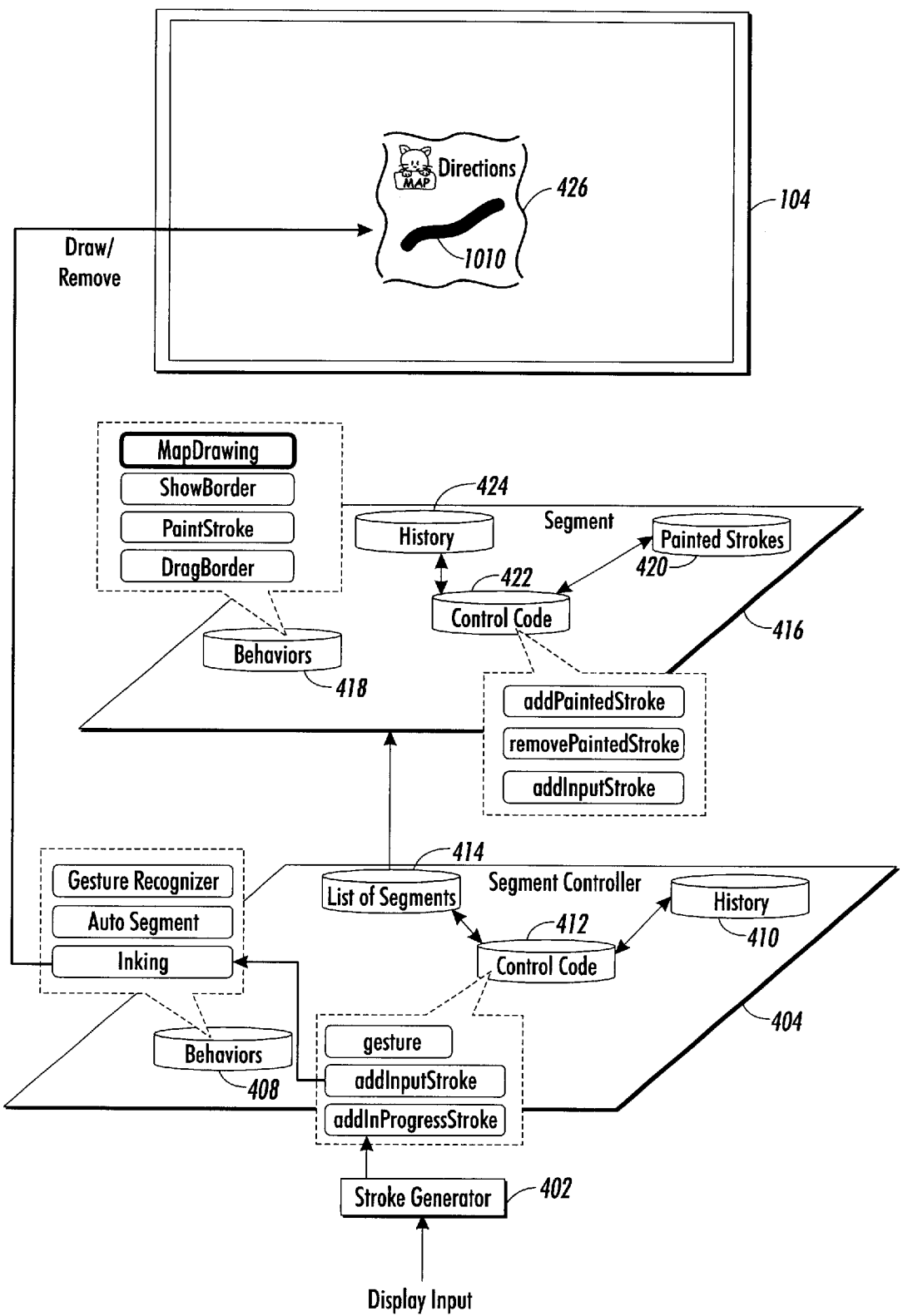
FIG. 10 illustrates the manner in which user input is processed before it becomes an input stroke.
Figure 11:
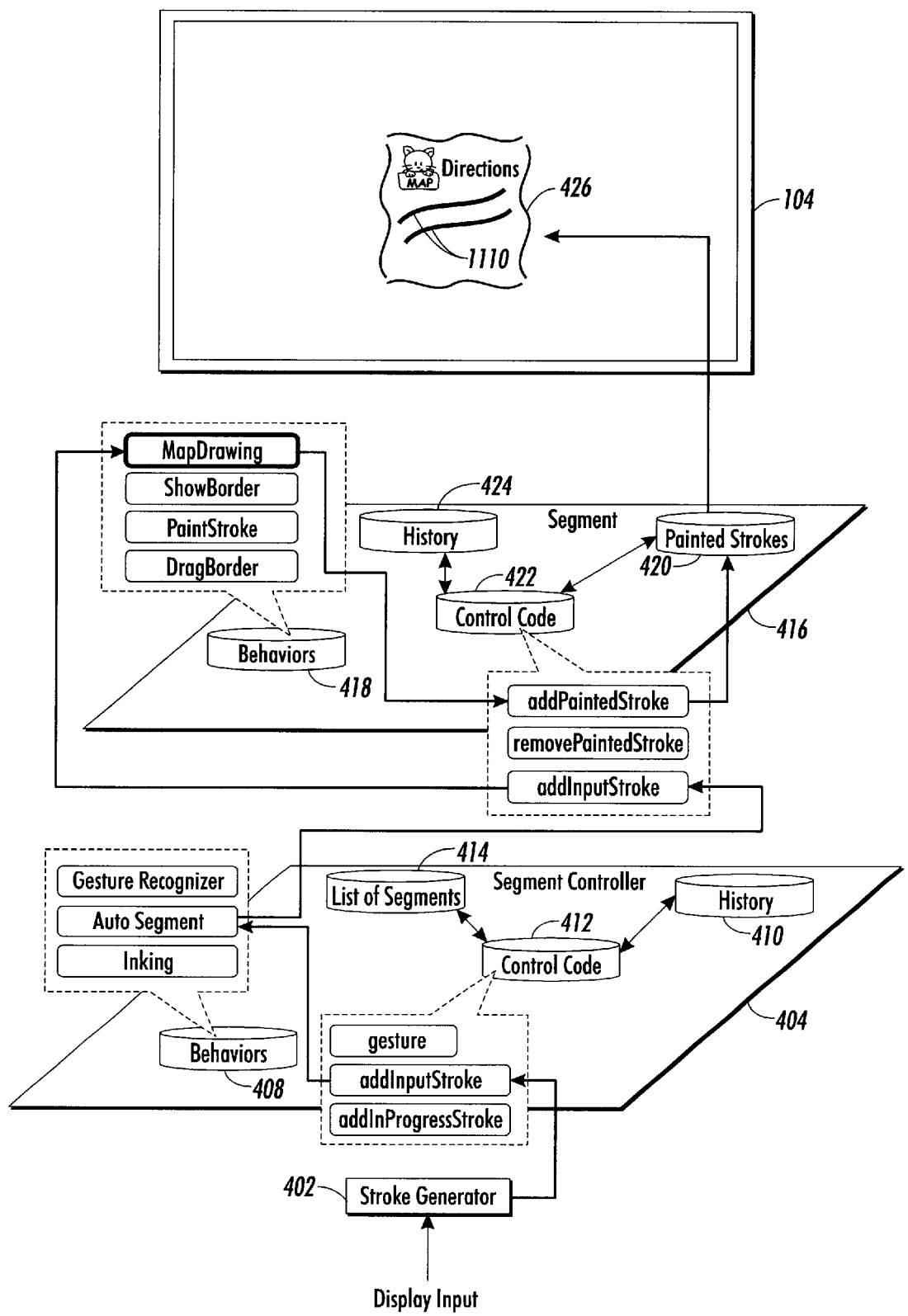
FIG. 11 illustrates the operations performed when an input stroke is processed by an application behavior.

FIGS. 9–11 illustrate an example of the manner in which behaviors interact with segments. More specifically, FIG. 9 illustrates the manner in which a behavior is added to a segment. As set forth above, a behavior is added to a segment with a gesture corresponding meta-stroke in the segment. More specifically, the gesture performed in a segment invokes the behavior command 610 (shown in FIG. 6) that allows a behavior to be selected from the behavior menu 702 (shown in FIG. 7).

In the example in FIG. 9, a map behavior 428d is selected. The stroke generator 402, which receives display input, is directed to a gesture method in the control code 412 of the segment controller. The gesture method subsequently passes the event of adding a new behavior to a segment to the gesture recognizer behavior in the behaviors 408 of the segment controller. The gesture recognizer identifies the segment in which the gesture was performed. If the gesture was performed outside of a segment, then the gesture recognizer method creates a new segment. Subsequently, the gesture recognizer behavior calls the add/remove behavior method in the control code of the identified segment to add the map drawing behavior to the set of behaviors 418 of the identified segment.

Depending on the behavior, painted strokes that exist before a behavior is added to a segment are interpreted by the behavior. For example, in the case of the map behavior, pre-existing painted strokes grouped in a segment are not interpreted by the behavior; only strokes that are added after the behavior was attached to the segment are interpreted by the behavior, unless the strokes were added while the map behavior was previously in effect. In the example illustrated in FIG. 9, the strokes defining "directions" in the segment on the display are not processed by the map behavior because they were grouped with the segment before the behavior was added to the segment.

FIG. 10 illustrates the manner in which user input is processed before it becomes an input stroke. That is, freehand strokes input at the display are inked on the display as they are drawn. In accordance with the invention, each behavior only observes completed input strokes. Thus, a behavior is not invoked by the control code of a segment until a user completes a stroke on the display (e.g., when the stylus is lifted off the display). In one embodiment, an input stroke is defined by the locations at which an input device travels while being in contact with the surface of the display (i.e., an array of vertices that represent visual ink). As illustrated in FIG. 10, the stroke generator 402 directs in progress strokes to the add in progress stroke method in control code 422. This method then calls the inking behavior in the set of behaviors 408 to draw the in progress stroke on display 104, which in this example is a single line 1010.

FIG. 11 illustrates the operations performed when an input stroke is processed by the map behavior. In this example, the map behavior replaces the single line input stroke 1010 (shown in FIG. 10) with a double line output stroke 1110 to represent a road. In operation, the stroke generator 402 directs input strokes to the add input stroke method in the control code 412. This method calls the auto segment behavior of the segment controller. The auto segment behavior automatically groups strokes on the display together into a segment according to the spatial proximity of an input stoke to existing strokes on the display. After identifying the segment to which the input stroke should be grouped with, the add input stroke method in the control code of the identified segment is invoked. This method calls the map drawing behavior, which in turn calls the add painted stroke method in the control code 422, as described in detail in discussion relating to FIG. 8.

F. History Management

In accordance with the invention, freeform data in the form of strokes can be recovered after being erased (i.e., deleted) from the display. Because the data is in the common form of strokes it is not stored and identified by a user assigned identifier (e.g., a name) and filing location (e.g., directory). The data, therefore, cannot be readily searched for using a pre-assigned identifier or filing location as in most window based systems. To overcome these limitations, data is stored by the system in memory 110 with contextual identifiers that record the surroundings in which a stroke is made on the display. For example, the contextual identifiers can include: the date and time the stroke was made on the display; the color(s) of the stroke; the input device when a plurality exist; the spatial location of the stroke on the display; the users at the display when the stroke was input; and active and past behavior history associated with the stroke.

By recording contextual identifiers with freeform input, the history of user interactions with the display is implicitly recorded for later retrieval. That is, every event that occurs on the surface of the display is continuously recorded without user input. Although no explicit attention is required from a user operating the system to record these contextual identifiers to recover data, the system provides a user with the ability to expressly record contextual identifiers in the form of a snapshot in time by invoking the take snapshot command 608. In one embodiment, strokes and their contextual identifiers are stored using a Placeless Document system that organizes documents according to their properties rather than their location. More specific details of the Placeless Document system are disclosed in the following U.S. patent application Ser. Nos.: 09/143,772; 09/144,032; 09/143,551; 09/144,383; 09/143,802; 09/143,773; 09/143,778; 09/144,143; 09/144,231; 09,143,777; 09/143,555, which are incorporated herein by reference. In this embodiment, the system saves every "dirty" segment periodically in the Placeless Document system. Each segment is represented as a discrete Placeless document with system specific objects tagged onto it as key/value data. The contents of each document are the serialized command objects that represent the segment's history. The system maintains a "segment cache," which reflects all "live" segments currently presented on the display. If an old segment needs to be retrieved (either because the user searched for it, or an undo and time slider operation causes the segment to become live again), it is retrieved from persistent storage.

The pie menu 602 shown in FIG. 6 provides three modes for accessing automatically stored strokes, segments, and behavior history. The first mode is infinite undo and redo mode which is iteratively enacted to step through the history of strokes, segments and behaviors. Using the undo command 614 and the redo command 606, the user can access any past state of a selected segment. The second mode is accessed by selecting the time slider command 612, which activates a time slider tool 1202, an example of which is shown in FIG. 12. Using the time slider tool 1202, the user can specify the time point directly using slider 1204, or use jump buttons 1206 to get to discrete "interesting" time points. Interesting points are states prior to long periods of no input, prior to input to another segment, prior to removing that segment, and explicit snapshots. The third mode is context-based search, which is operated using the find behavior 428e shown in FIG. 4. Once invoked, the search behavior 428e allows a user to retrieve previous strokes and segments based using any of the contextual identifiers set forth above. In one embodiment not shown, search results are shown as a set of thumbnails on the display.

FIGS. 13 and 14 in combination with FIGS. 4 and 8 illustrate how atomic changes to segments are automatically recorded to enable semantic jumping to different points in the history of data recorded and interpreted by the system. As set forth above, data is automatically attached or grouped with a segment. To enable semantic jumping, a transaction groups the original input data with the resulting output data. For example, if the original input is an input stroke and the output is a painted stroke, both the input stroke and the painted stroke are saved as part of a transaction in FIGS. 13 and 14. Thus, interpretations of strokes by behaviors, which are illustrated in the FIGS. 13 and 14 by horizontal arrows (e.g., arrow 1308), can be undone or redone as an atomic unit of execution by identifying specific begin and end points using transactions.

FIG. 13 illustrates a transaction being opened and closed as a behavior is executed by a segment. Transaction data for each segment is stored in history 424. In addition, transaction data is stored by the segment controller in history 410. Semantic jumping for the segment shown in FIG. 13 is performed by jumping between the opening and closing of the first transaction executed by the segment 1302 as indicated by arrows 1304 and 1306, respectively. FIG. 14 illustrates the manner in which semantic jumps are performed by the segment controller. In FIG. 14, the segment 1402 has the history defined in FIG. 13. However, using "global" segment jumps, the history of all segments on the display can be reviewed simultaneously. For example, the segment jumps 1404, 1406, 1408, and 1410 provide semantic jumps in which to review the history of data rendered on the display as a whole.

G. Segment Management

Segment management is an important enabler that frees a user from having to define structures before inputting data into the system. Unlike a window based system, a specific file need not be created before user input in the form of freeform strokes, for example, is recorded by the system. In addition, a user is capable of organizing automatically segmented strokes in real time. Similar to any physical notepad or whiteboard, the freeform display editing system 102 provides users with the ability to draw handwritten strokes anywhere on the display simply by dragging the user input device (e.g., stylus) on the surface. Erasing is done by creating a scribbling meta-stroke on an object to be deleted with the button 107 of the user input device as illustrated by stroke 506 on object 507 in FIG. 5.

Unlike strokes created on a physical notepad or whiteboard, the system 102 automatically groups strokes together in a segment. Each segment 426 is presented to a user by a boundary of surrounding its strokes. As shown in FIG. 15, if a stroke 1502 is drawn within a segment 426d, it is automatically joined with that existing segment 426d. However, as shown in FIG. 16, when a stroke 1602 is drawn in open space away from any other segment (e.g., segment 426d), a new segment 426e is created. A user can move a segment by making the meta-stoke 504 (shown in FIG. 5) starting at the segment's boarder. An embedded behavior "drag border" in the segment responds to this event through the segment controller, and moves the segment according to the movement of the user input device. This results in the generation of a "surface moved" event for each of the application behaviors on other segments to update their internal structures.

In addition, a user may manually join a segment, as shown in FIG. 17, or split a segment, as shown in FIG. 18. Segments are joined when the user draws a joining stroke (e.g. stroke 1702), which is a horizontal line that extends from one segment to the other. In order to merge (i.e., join) segments, the segment controller constructs a new segment (e.g., 426f), and calls its "add painted stroke" method using all strokes in the original segments (e.g., 426d and 426e) as arguments. Subsequently, the system deletes the original segments (e.g., 426d and 426e). A segment is split when the user draws a splitting stroke (e.g. stroke 1802), which is a vertical line that crosses the segment. This event is handled by the segment controller instead of the segment that is being split. The segment controller constructs a new segment, and transfer strokes one by one by calling the delete painted stroke method of the original segment and the add painted stroke method of the new segment.

Figure 21:
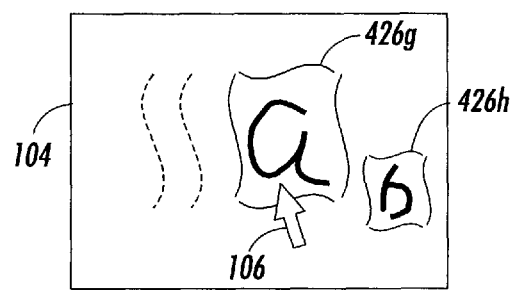
FIG. 21 illustrates the squashing of the segment (with a "b") as a result of the action initiated in FIG. 19 with respect to the segment (with an "a")

In one embodiment, segments are not permitted to overlap in order to ensure strokes on the display remain visible. In order to manage segments on the display that are dynamically created by the system, a user is given the ability to drag a segment 426g by grabbing its boundary with the user input device 106 as shown for example in FIG. 19. However, if the segment 426g collides with another segment 426h, the collided segment 426h is pushed away as shown for example in FIG. 20. If no more space is available, the collided segment 426h starts to shrink to give more space as shown for example in FIG. 21. When a user starts working on a segment that has been shrunk, the segment is restored to its original size.

Similar to moving a segment, a "surface moved" event occurs when one segment is pushed away from another segment. When the "drag border" behavior tries to move a segment, the segment asks the segment controller for space on the display. If any segment occupies that space, the segment controller pushes it away to make space. The pushed segment then request space for itself. This process continues as a segment is pushed against a display boundary.

When a segment is at the boundary of the display, the segment starts to shrink to create additional space for the segment being moved. When a segment shrinks, the actual coordinates of its strokes remain unchanged. Instead, the segment maintains a scale field, and the "paint stroke" embedded behavior renders the scaled stroke on the display. In other words, the shrinking effect occurs only superficially.

H. Operating Behaviors with Segments

Behaviors provide a way to associate domain-specific computational processing with a particular segment. Advantageously, segments can have multiple behaviors active at any instant in time. A further advantage is that behaviors can be attached to and removed from a segment on the fly, even after a segment has been created and a set of strokes associated with it. Yet another advantage is that the visual representation of the output strokes in a segment is maintained by the segment so that most behaviors (e.g., except the paint stroke and show border behaviors) are not allowed to directly render output on the display.

H.1. Event Processing

A segment delegates actual computation to behaviors attached to it in the form of events. Behaviors respond to various events occurring on a segment, and modify the segment's stroke set or perform specific operations. In one embodiment, the process that a segment uses to distribute events to its behaviors is an implementation that uses the principles of the listener model of the Java language. Using this model, when a segment detects an event from the root segment, the segment distributes the event to behaviors equipped with a corresponding event listener such as "surface listener," "stroke listener," and "meta-stroke listener."

The "surface listener" of a segment handles events that are related to the segment's configuration. That is, it reacts to changes in segment location, size, activation, and inactivation. The "surface listener" also reacts to request for painting the segment on the display. Most embedded behaviors are instances of this listener. For example, the paint stroke and show border embedded behaviors (e.g., FIGS. 9–11) respond to requests for painting strokes on the display. Some application behaviors respond to this event by modifying their internal structures.

The "stroke listener" of a segment handle the input strokes drawn by a user. This event listener is used by the application behavior to detect input strokes. The "meta-stroke listener" of a segment handles the events related to meta-strokes. The drag border behavior responds to this event, and some application behaviors use this event to handle specific gestures such as erasing.

H.2. Embedded Behaviors

Embedded behaviors are implicitly attached to a segment and work as part of an underlying system of services. In one embodiment, these services are implemented as part of a segment. In another embodiment, these services are implemented as embedded behaviors. As embedded behaviors, these services are defined as separate entities thereby making the system more extensible. For example, the appearance of a segment on the display can be changed by modifying an embedded behavior without modifying the segment itself. In addition, new services can be added to a segment by adding a new embedded behavior.

H.3. Application Behaviors

As set forth above, a user of the freeform display editing system 102 is permitted to freely attach and detach application behaviors to segments. In operation, an application behavior interprets a user's freeform strokes and responds with output strokes that are represented using an informal "handwriting" style. More specifically, an application behavior receives an input stroke from the segment controller, and modifies a set of painted strokes maintained by the segment. Some possible application behaviors that can be attached to segments are described below.

Figure 22:
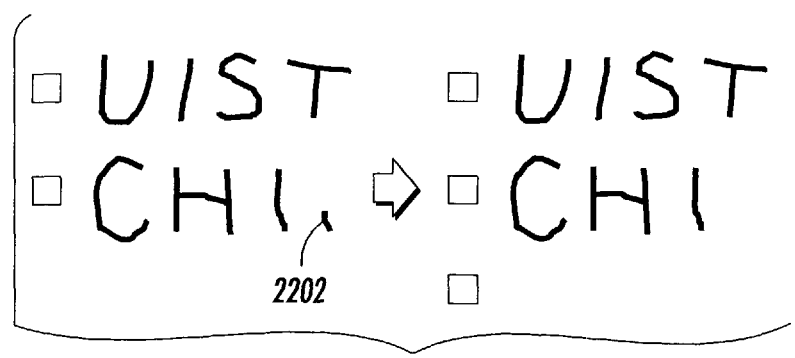
FIG. 22 illustrates the adding of an item in a segment with a to do list behavior attached thereto.
Figure 23:
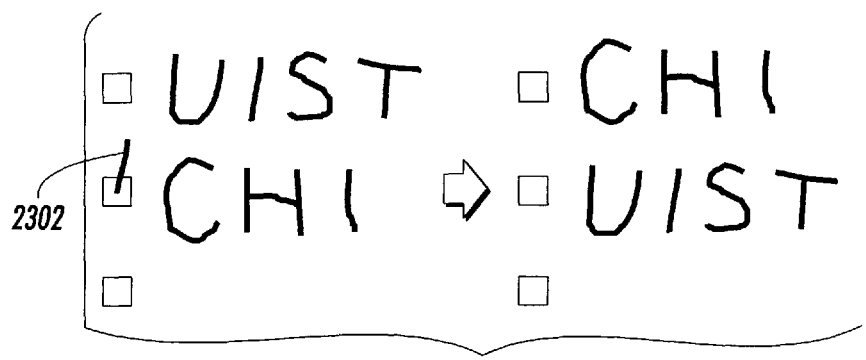
FIG. 23 illustrates the reordering of items in a segment with a to do list behavior attached thereto.

The to do list behavior, which is activated with icon 428c in FIG. 7, maintains a vertical list of handwritten items with checkboxes. A new item is created when the user draws a short stroke (e.g., stroke 2202 shown in FIG. 22). A vertical stroke that starts at a checkbox reorders an item in the list (e.g., stroke 2302 in FIG. 23), whereas a horizontal line deletes an item in the list.

Figure 24:
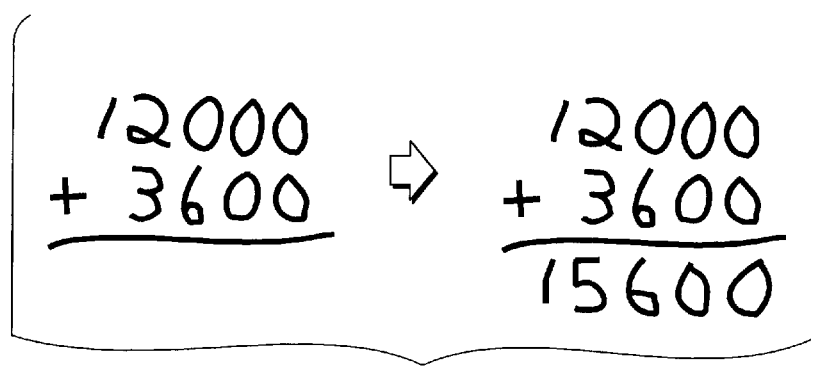
FIG. 24 illustrates the output created on a display when a calculator behavior is attached to a segment.

The calculator behavior, which is activated with icon 428a in FIG. 7, recognizes handwritten formulas in a segment and returns the result of calculation. For example, when a user draws a desired formula using hand drawn numbers, this behavior will display the result in handwriting style when the user draws a long horizontal line below the formula (see FIG. 24).

Figure 25:
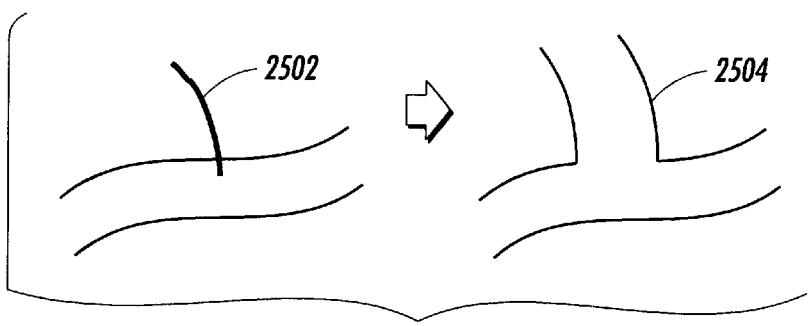
FIG. 25 illustrates the output created on a display when a map behavior is attached to a segment and a new street is added.
Figure 26:
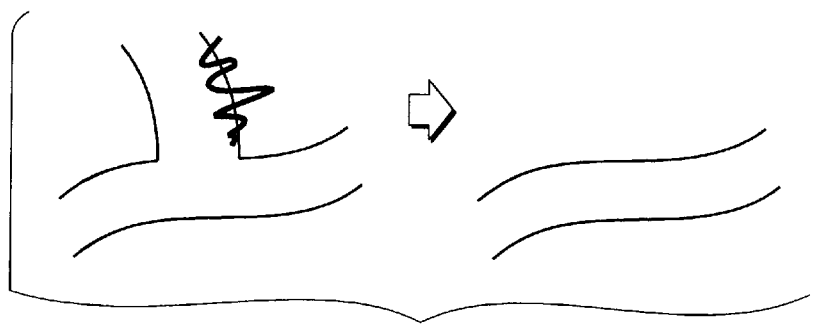
FIG. 26 illustrates the output created on a display when a map behavior is attached to a segment and a street is erased.

The map drawing behavior is activated with icon 428d in FIG. 7. In operation, the behavior turns input strokes (e.g., stroke 2502 shown in FIG. 25) into double line representing streets (e.g., stroke 2504). Intersections are added (see FIG. 25) or erased (see FIG. 26) from a map representation as appropriate.

Figure 27:
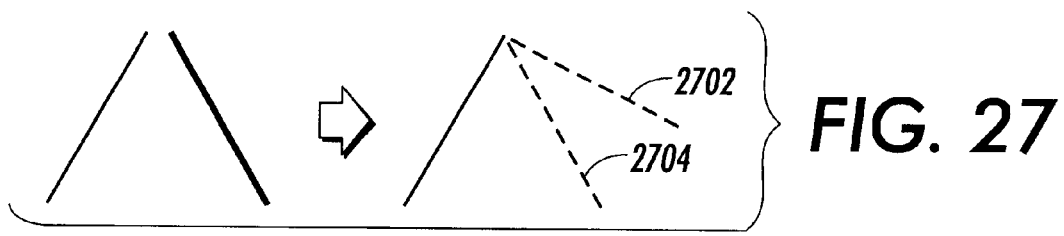
FIG. 27 illustrates the output created on a display when a two-dimensional geometric drawing behavior is attached to a segment and the behavior suggests beautification of user input.
Figure 28:
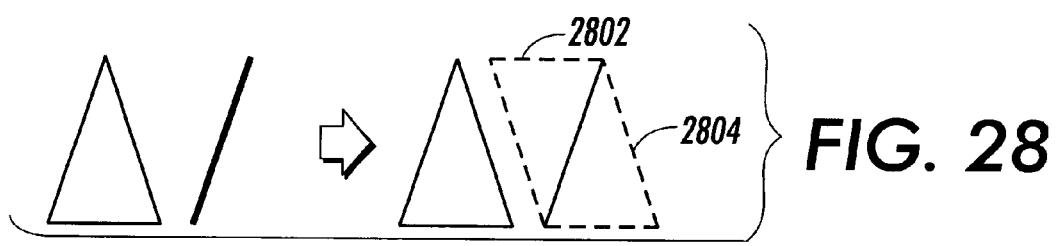
FIG. 28 illustrates the output created on a display when a two-dimensional geometric drawing behavior is attached to a segment and the behavior predicts user input.

A two dimensional drawing behavior applied to a segment automatically beautifies freeform strokes in the segment that are considered by the behavior to define a geometric relationship. This behavior will generate multiple candidates and present them in a different color on the display for selection by the user (see for example candidates 2702 and 2704 in FIG. 27). In addition, this behavior will predict a subsequent drawing based upon the spatial relationship among an input stroke and existing painted strokes in a segment (see for example candidates 2802 and 2804 FIG. 28).

Figure 29:
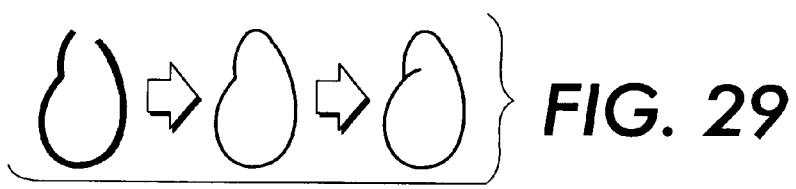
FIGS. 29 and 30 illustrate the output created on a display when a three-dimensional geometric drawing behavior is attached to a segment and the behavior assists in the creation of three-dimensional objects.
Figure 30:
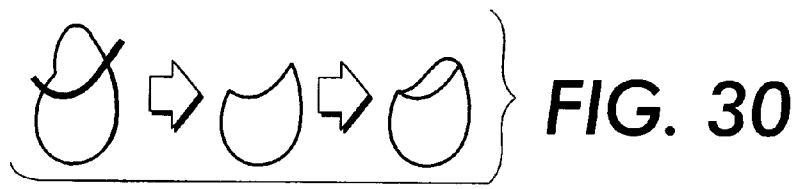

A three dimensional drawing behavior automatically constructs a 3D model based on a two dimensional freeform input stroke (see FIG. 29). In addition, meta-strokes can be used to rotate the constructed 3D model or perform editing operations (see FIG. 30). The three dimensional drawing behavior has an internal 3D polygonal model. The behavior renders the model by adding painted strokes representing visible silhouette edges to the segment's stroke set. When the user rotates the model, the behavior removes all previous strokes, and adds new strokes. Unlike other application behaviors, it directly responds to low level meta-stroke events to implement rotation.

The search behavior is a part of the system infrastructure, and is very different from other application behaviors. While other application behaviors provide feedback by editing the segment's stroke set and letting the paint stroke embedded behavior paint them, the search behavior paints buttons and search results to the screen by itself. This prevents search results from being recorded as new strokes.

Figure 31:
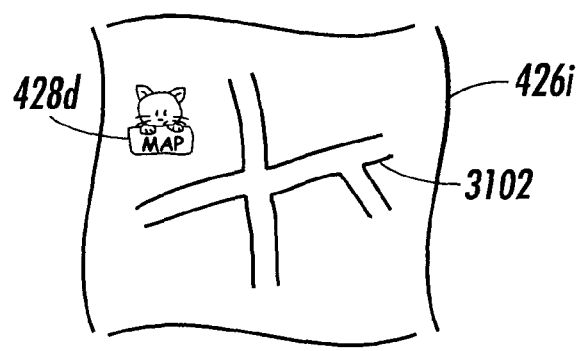
FIGS. 31–33 illustrate the addition and removal of different behaviors to a segment over time.
Figure 32:
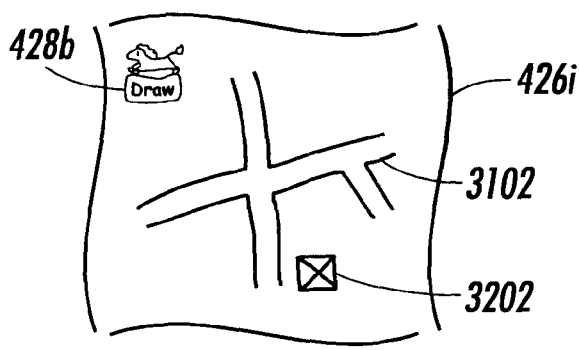
Figure 33:
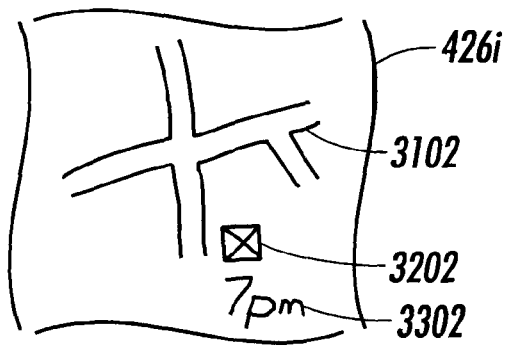

Unlike application programs in a standard window system, application behaviors can be flexibly applied to and removed from a segment. In addition, different behaviors can be used in combination on the same segment 426i over time as shown for example in FIGS. 31–33. In order to draw a map, the user draws streets 3102 using the map behavior 428d as shown in FIG. 31. Subsequently in this example, the user draws a building 3202 using the two dimensional drawing behavior 428d as shown in FIG. 32. Finally in this example, the user adds comments 3302 without any behaviors attached to the segment 426i as shown in FIG. 33.

H.4 Recording Behavior Specific Information

Figure 34:
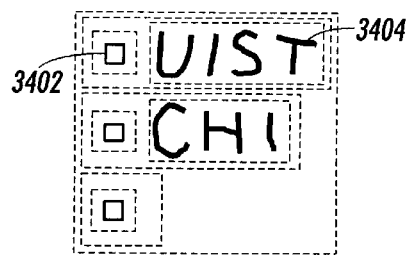
FIG. 34 illustrates an example of the specific internal structure of a to do behavior that is maintained in the stroke set of a segment (i.e., painted strokes)

While an application behavior does not maintain sets of painted strokes, an application behavior may record additional internal information about the strokes of a host segment. This internal behavioral information disappears when a behavior is detached from a segment, and is reconstructed when the behavior is re-attached. For example as shown in FIG. 34, the to do behavior 428c attached to a segment maintains a list of to do items. Each to do item has a corresponding check box 3402 and strokes 3404.

Figure 35:
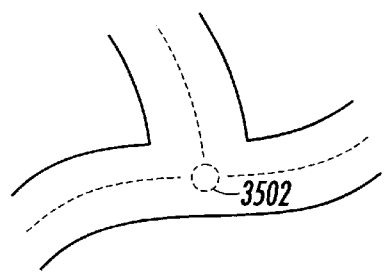
FIG. 35 illustrates an example of the specific internal structure of a map behavior that is maintained in the stroke set of a segment (i.e., painted strokes)

Also, as shown for example in FIG. 35, the map drawing behavior 428d maintains a graph representation of streets and intersections internally. Each street has pointers to the two painted strokes representing a street, and each intersection (e.g., intersection 3502) has pointers to the streets connected to it. When an input stroke is received by the map behavior, it first examines whether the stroke overlaps some existing streets. If no overlap is found, the map drawing behavior creates two painted strokes at the both sides of the input stroke, and adds them to the segment's stroke set. In addition, the map drawing behavior adds the new street to its street set. If the stroke overlaps some existing street, the behavior divides the street and the input stroke at the section, and reconstructs the appropriate graph topology. The behavior deletes the painted strokes associated with the modified street, and adds a set of new painted strokes. When a user tries to erase a painted stroke, the behavior erases the corresponding street. Then it reconfigures its internal graph representation and edits the segment's stroke set.

Some behaviors, however, such as the plain drawing and the calculation behavior do not maintain an internal structure. When activated, the plain drawing behavior adds a new input stroke to a segment stroke set directly, and removes a painted stroke when it detects the erasing gesture. The calculation behavior operates just as a plain drawing behavior until a user draws a long horizontal stroke requesting calculation. When this event happens, the behavior searches for the set of strokes above the horizontal stroke, and hands them to a handwriting recognizer. The recognizer returns the symbolic representation of a formula. The behavior calculates it, and adds a set of painted strokes that represent result digits to the segment's stroke set. This behavior maintains no internal structure, and scans the entire segment each time. As a result, this behavior accepts any painted stroke as input, including the painted strokes created by the behavior itself or those painted before the behavior is applied to the segment.

H.5 Reapplication of Application Behaviors

As mentioned previously, behavior specific internal structure is lost when a behavior is removed from a segment. However, the structure is recovered when the behavior is reapplied to the same segment. Because segments are dynamically merged and split, behavior specific structures are not stored in a segment. Instead, the behavior specific structures are stored with each stroke in painted strokes 420 (see FIG. 4). Each painted stroke in painted strokes 420 records a behavior's partial internal structures in addition to the data that defines the appearance of the stroke on the display (e.g., size, color, shape, etc.). As a result, a behavior that is reapplied to a segment uses these partial structures stored in a segment's set of painted strokes to recover the entire structure. By saving behavior state information with each stroke in a segment, segments can be split and joined while maintaining behavior specific internal structure.

Figure 36:
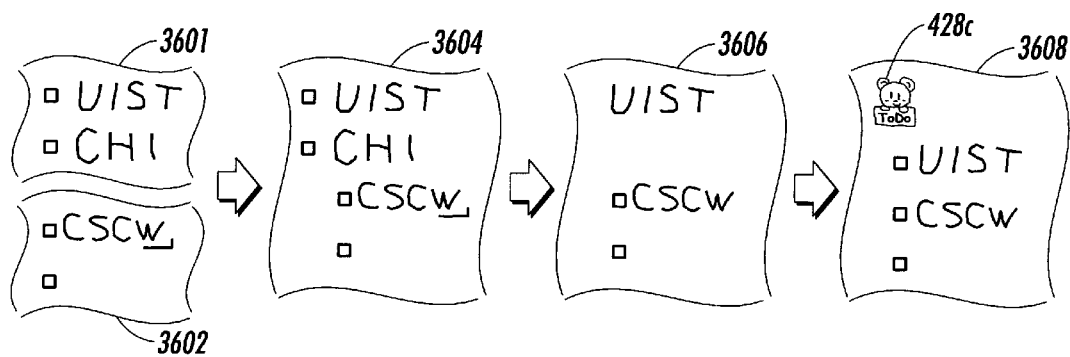
FIG. 36 illustrates that the reapplication of a behavior to a segment maintains the properties of strokes originally created while the behavior was attached to the segment.

For example, the to do behavior gives each painted stroke a pointer to a corresponding to do item object. When the to do behavior is reapplied to a segment, it examines its set of painted strokes, and groups them based on the associated to do item objects. Each to do item can originate from different to do behaviors. Then, the to do behavior constructs a list of to do items, and organizes the strokes appropriately. FIG. 36 illustrates the reapplication of a to do behavior. Initially, a first segment 3601 and a second segment 3602 have their to do behaviors removed. These segments are jointed as segment 3604 and edited at segment 3606. By reapplying the to do behavior at segment 3608, behavior specific internal structures are recovered.

Figure 37:
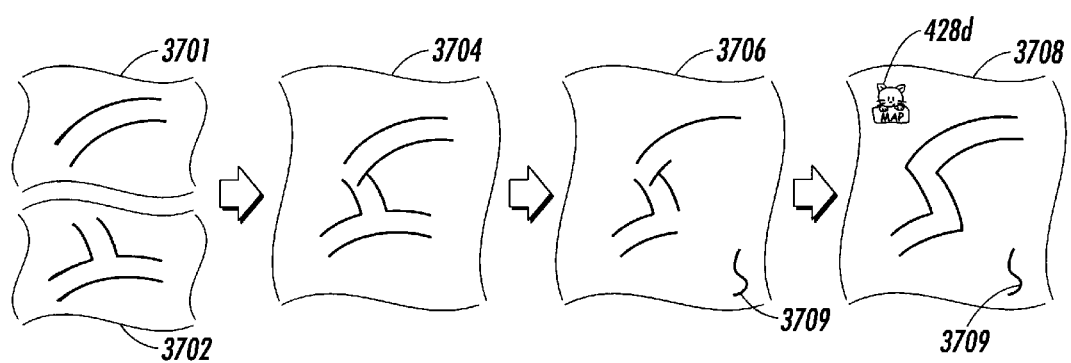
FIG. 37 illustrates that the reapplication of a behavior to a segment does not change the strokes generated by other behaviors.

Also, for example the map drawing behavior embeds a pointer to the corresponding street object in a painted stroke to preserve its internal structures after being attached, then detached and reattached to a segment. When a map drawing behavior is reapplied to a segment, it extracts the set of street objects embedded in the painted strokes, and constructs a complete street-intersection graph. Consequently, existing street objects could have been generated by the map drawing behavior attached at different points in time. For example, FIG. 37 illustrates the reapplication of a map drawing behavior. Initially, a first segment 3701 and a second segment 3702 have their map behaviors removed. These segments are jointed as segment 3704 and edited at segment 3706. Strokes generated by other behaviors remain unchanged (e.g., stroke 3709) when the map behavior 428d is reapplied to the segment 3708, while strokes generated with the map behavior retake a shape defined by their internal structures as interpreted by the map behavior.

In addition for example, the 3D drawing behavior embeds a pointer to the 3D model in each stroke. When the behavior is reapplied to a segment, it extracts the 3D geometry from the stroke. If more than one 3D model is found in a stroke set, the 3D drawing behavior selects one to apply to all affected strokes.

I. Summary

It will be appreciated by those skilled in the art that the shape defining the bounded region of a segment need not be rectangular as illustrated in the Figures. Instead, the bounded region of a segment may for example have an oval or circular shape. It will further be appreciated by those skilled in the art that segments can be permitted to overlap even though freeform data may be obscured. Also, it will be appreciated by those skilled in the art that a system can operate with a single segment that effectively occupies the entire display.

Further details of the system incorporating the present invention are disclosed in the following publications, which are incorporated herein by reference in their entirety: Elizabeth D. Mynatt, Takeo Igarashi, W. Keith Edwards, Anthony LaMarca, "Flatland: New Dimensions in Office Whiteboards", ACM SIGCHI Conference on Human Factors in Computing Systems, Conference Proceedings, Pittsburgh, May 15–20, 1999, pp. 346–353; Takeo Igarashi, Elizabeth D. Mynatt, W. Keith Edwards, Anthony LaMarca, "Demonstrating Flatland User Interfaces," ACM SIGCHI Conference on Human Factors in Computing Systems, Extended Abstract, Pittsburgh, May 15–20, 1999, pp.27–28; and Takeo Igarashi, Elizabeth D. Mynatt, W. Keith Edwards, Anthony LaMarca, "Flatland: An Electric Whiteboard System," demonstration movie published on the internet at http://www.mtl.t.u-tokyo.ac.jp/~takeo/research/flatland/flatland.html.

In addition, it will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for operating a freeform display editing system including a display and a user input device for generating freeform input strokes, comprising:

receiving at a segment controller a freeform input stroke generated with the user input device; the segment controller distributing the freeform input stroke to a selected segment that maintains a set of freeform output strokes in a memory; the selected segment identifying a unique region of the display;

dispatching at the selected segment the freeform input stroke to a plurality of behaviors; the plurality of behaviors being associated with the selected segment and including at least one user specified application behavior and at least one embedded behavior;

processing the freeform input stroke at the plurality of behaviors associated with the selected segment; each of the plurality of behaviors interpreting the set of freeform output strokes recorded in the memory independent of each other; and rendering, after processing the freeform input stoke at the plurality of behaviors, in the unique region of the display the set of freeform output strokes recorded in the memory.

2. The method according to claim 1, further comprising rendering on the display an indicator identifying each user specified application behavior operating with a segment.

3. The method according to claim 1, further comprising generating at the segment controller a new segment when the physical region of the display at which the location of the freeform input occurs is outside a physical region of the display represented by an existing segment.

4. The method according to claim 1, further comprising associating at least one embedded behavior with each segment.

5. The method according to claim 1, further comprising adding a user specified behavior to a segment without modification to freeform output strokes that define how the uniquely identifiable non-overlapping region of the segment appears on the display.

6. The method according to claim 1, further comprising removing a user specified behavior associated with a segment without modifying freeform output strokes that define how the uniquely identifiable non-overlapping region of the segment appears on the display.

7. The method according to claim 1, further comprising recording representations of freeform output strokes rendered on the display to generate behavior specific histories of segments.

8. The method according to claim 7, further comprising recording transactions for defining behavior specific histories of segments with freeform output strokes.

9. The method according to claim 7, further comprising composing a global history by interleaving the behavior specific histories of a plurality of segments together.

10. The method according to claim 1, wherein the freeform output strokes of the selected segment are rendered on the display in a bounded region.

11. The method according to claim 1, wherein the freeform input strokes are distributed to one of a plurality of segments that represents a uniquely identifiable region of the display.

12. The method according to claim 1, wherein the freeform input strokes are distributed to one of a plurality of segments that represents a uniquely identifiable non-overlapping region of the display.

13. The method according to claim 1, further comprising:

storing a behavior specific structure with identified freeform output strokes in the set of freeform output strokes stored in the memory;

removing the user specified application behavior from the selected segment;

modifying the identified freeform output strokes; and reapplying the user specified application behavior to the selected segment; the user specified application behavior accessing the behavior specific application behavior stored with the identified freeform output strokes.

14. A freeform display editing system, comprising:

a display;

a user input device coupled to the display for generating freeform input strokes;

a segment controller for receiving a freeform input stroke generated with the user input device;

a selected segment identifying a unique region of the display; the selected segment receiving the freeform input stroke from the segment controller and maintaining a set of freeform output strokes in a memory;

a plurality of behaviors being associated with the selected segment and including at least one user specified application behavior and at least one embedded behavior; the selected segment dispatching the freeform input stroke to the plurality of behaviors; and a processor coupled to the display for processing the freeform input stroke at the plurality of behaviors associated with the selected segment; each of the plurality of behaviors being adapted to interpret the set of freeform output strokes recorded in the memory independent of each other; the processor rendering the set of freeform output strokes recorded in the memory in the unique region of the display after processing the freeform input stoke at the plurality of behaviors.

15. The freeform display editing system according to claim 14, further comprising:

means for storing a behavior specific structure with identified freeform output strokes in the set of freeform output strokes stored in the memory;

means for removing the user specified application behavior from the selected segment;

means for modifying the identified freeform output strokes; and means for reapplying the user specified application behavior to the selected segment; the user specified application behavior accessing the behavior specific application behavior stored with the identified freeform output strokes.

16. The freeform display editing system according to claim 14, further comprising an indicator on the display for identifying each user specified application behavior operating with a segment.

17. The freeform display editing system according to claim 14, wherein the segment controller generates a new segment when the physical region of the display at which the location of the freeform input occurs is outside a physical region of the display represented by an existing segment.

18. The freeform display editing system according to claim 14, wherein at least one embedded behavior is associated with each segment.

19. The freeform display editing system according to claim 14, further comprising adding a user specified behavior to a segment without modifying freeform output strokes that define how the uniquely identifiable non-overlapping region of the segment appears on the display.

20. The freeform display editing system according to claim 14, wherein the freeform output strokes of the selected segment are rendered on the display in a bounded region.

\* \* \* \* \*